US010719887B2

(12) United States Patent
Nakayama

(10) Patent No.: US 10,719,887 B2
(45) Date of Patent: Jul. 21, 2020

(54) NON-TRANSITORY COMPUTER-READABLE MEDIUM, DATA MANAGEMENT SYSTEM AND DATA MANAGEMENT SERVER

(71) Applicant: BROTHER KOGYO KABUSHIKI KAISHA, Nagoya-shi, Aichi-ken (JP)

(72) Inventor: Tomofumi Nakayama, Tokoname (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 397 days.

(21) Appl. No.: 14/632,616

(22) Filed: Feb. 26, 2015

(65) Prior Publication Data
US 2015/0242964 A1    Aug. 27, 2015

(30) Foreign Application Priority Data

Feb. 27, 2014  (JP) .................................. 2014-036733

(51) Int. Cl.
*G06Q 40/00* (2012.01)
(52) U.S. Cl.
CPC .................................. *G06Q 40/12* (2013.12)
(58) Field of Classification Search
None
See application file for complete search history.

(56) References Cited

U.S. PATENT DOCUMENTS

| 7,693,794 | B2* | 4/2010 | Wind | G06Q 10/02 705/44 |
| 8,095,439 | B1* | 1/2012 | Harman | G06Q 20/0453 705/16 |
| 8,392,310 | B1* | 3/2013 | Praisner | G06Q 40/02 705/36 T |
| 2004/0083134 | A1 | 4/2004 | Spero et al. | |
| 2005/0033677 | A1* | 2/2005 | Birdsong | G06Q 10/10 705/35 |

(Continued)

FOREIGN PATENT DOCUMENTS

| JP | 4-256165 A | 9/1992 |
| JP | 2001-034627 A | 2/2001 |

(Continued)

*Primary Examiner* — Allen C Chein
*Assistant Examiner* — Denisse Y Ortiz Roman
(74) *Attorney, Agent, or Firm* — Merchant & Gould P.C.

(57) ABSTRACT

A non-transitory computer-readable medium stores computer-readable instructions. A processor of a server connected to a network executes the instructions to obtain expense data from a terminal device via the network, store the specific user ID, the image data, the receipt information data and expense identification information in a first storage in an associated manner. The processor identifies service identification information stored in a second storage and associated with the specific user ID stored in the first storage. The second storage is configured to store the service information including at least service identification information and user identification information. The service identification information is used for a series of data processing regarding a specific business process. The processor further stores the service identification information identified in the service identifying operation in the first storage so as to be associated with the expense identification information associated with the specific user identification information.

15 Claims, 10 Drawing Sheets

(56) References Cited

U.S. PATENT DOCUMENTS

2013/0191194 A1* 7/2013 Shreibati ................ G06Q 40/06
                                                     705/14.12
2013/0230205 A1* 9/2013 Nuggehalli .......... G06K 9/2054
                                                      382/100

FOREIGN PATENT DOCUMENTS

| JP | 2006-511896 A | 4/2006 |
| JP | 2009-188707 A | 8/2009 |
| JP | 2011-124962 A | 6/2011 |
| JP | 2012-226402 A | 11/2012 |

* cited by examiner

50

| User Information DB ||||||
|---|---|---|---|---|---|
| U-ID | Login ID | Password | Name | Credit Card Number | Bank Account Number |
| U0001 | yamadata | sn1e74b | Taro Yamada | XXXX-XXXX-XXXX-XXXX | 1111111 |
| U0002 | tanakaha | dsf83v0f | Hanako Tanaka | XXXX-XXXX-XXXX-XXXX | 1111112 |
| ... | ... | ... | ... | ... | ... |

| Service Information DB ||||||
|---|---|---|---|---|---|
| S-ID | U-ID | Purpose | Departure Date/Time | Arrival Date/Time | Estimated Amount |
| S0001 | U0001 | Business Trip to Tokyo | 2013/12/9 9:00 | 2013/12/12 18:00 | 35,000 JPY |
| ... | ... | ... | ... | ... | ... |

| Expense Settlement DB |||||
|---|---|---|---|---|
| K-ID | U-ID | S-ID | Total Money Amount | Attachment of Receipt |
| K0001 | U0001 | S0001 | 33,700 JPY | Attached |
| K0002 | U0002 | none | 2,000 JPY | Not Attached |
| ... | ... | ... | ... | ... |

FIG. 4

| | | | Basic Information DB | | | | |
|---|---|---|---|---|---|---|---|
| R-ID | K-ID | Date of Expense | Company Name | Purpose | Payment Method | Total Amount | Credit Card Number | Image Data |
| R0001 | K0001 | 2013/12/10 | BAR Z | Drink with B Company | Cash | 3,700 JPY | [None] | [Image of Receipt] |
| R0002 | K0001 | 2013/12/9 | XX Railway | Shinkansen (Nagoya <--> Tokyo) | Express Card | 10,000 JPY | [None] | [Image of Receipt] |
| R0003 | K0001 | 2013/12/9 ~ 2013/12/11 | Hotel X | Hotel Bills | Credit Card | 20,000 JPY | XXXX-XXXX-XXXX-XXXX | [Image of Receipt] |
| ... | ... | ... | ... | ... | ... | ... | ... | ... |

BAR Z

Thank You Very Much
X-X-X, Kabuki-cho, Shinjuku-ku, Tokyo
Phone: 03-5555-XXXX

2013/12/9 20:10:10

| Items | Price |
|---|---|
| Beer x 4 | ¥2,000 |
| Boiled Soybeans x 4 | ¥1,000 |
| Oden x 1 | ¥700 |
| Total | ¥3,700 |
| Cash | ¥3,700 |
| Change | ¥0 |

FIG. 9

| R-ID | Date of Expense | Company Name | Purpose | Payment Method | Total Amount | Credit Card Number | Image Data |
|---|---|---|---|---|---|---|---|
| r0001 | 2013/12/10 | BAR Z | Drink with B Company | Cash | 3,700 JPY | [None] | [Image of Receipt] |
| r0002 | 2013/12/9 | XX Railway | Shinkansen (Nagoya <--> Tokyo) | Express Card | 10,000 JPY | [None] | [Image of Receipt] |
| r0003 | 2013/12/9 ~ 2013/12/11 | Hotel X | Hotel Bills | Credit Card | 20,000 JPY | XXXX-XXXX-XXXX-XXXX | [Image of Receipt] |

| RM-ID | R-ID | Contents | Item | Amount |
|---|---|---|---|---|
| rm0001 | r0001 | Beer x 4 | Business Meals Expenses | 2,000 JPY |
| rm0002 | r0001 | Boiled Soybeans x 2 | Business Meals Expenses | 1,000 JPY |
| rm0003 | r0001 | Oden x 2 | Business Meals Expenses | 700 JPY |
| rm0004 | r0002 | Shinkansen | Transportation Expenses | 10,000 JPY |
| rm0005 | r0003 | Hotel Bill | Transportation Expenses | 20,000 JPY |

FIG. 12

NON-TRANSITORY COMPUTER-READABLE MEDIUM, DATA MANAGEMENT SYSTEM AND DATA MANAGEMENT SERVER

CROSS-REFERENCE TO RELATED APPLICATION

This application claims priority under 35 U.S.C. § 119 from Japanese Patent Application No. 2014-036733 filed on Feb. 27, 2014. The entire subject matter of the application is incorporated herein by reference.

BACKGROUND

Technical Field

The present disclosures relate a data management system configure to manage data extracted from receipts, a data management server for such a data management system, and non-transitory computer readable medium storing a data management program for such a data management server.

Related Art

Conventionally, there has been known a data management system designed to manage data extracted from receipts. In an illustrative conventional system, an image of a receipt captured by a scanner or a digital camera is analyzed and text data is generated. Then, from the text data, expense data is extracted, which is input to an expense report. The expense report is revised and/or additional data is added to the expense report. The expense report is revised or additional data is added to the expense report by the user, depending on necessity, and then the revised/modified expense report is stored.

SUMMARY

According to aspects of the disclosures, there is provided a non-transitory computer-readable medium storing computer-readable instructions. The instructions, when executed by a processor of a server configured to be connected to a network, performs processes including an obtaining operation obtaining expense data from a terminal device which is connected via the network, the expense data including at least specific user identification information, image data and receipt information data, the specific user identification information identifying a specific user, the image data representing an image of a receipt, the receipt information data representing letters and characters included in the image data, the specific user identification information being user identification information identifying a user, a first storing operation storing, in a first storage, the specific user ID, the image data, the receipt information data and expense identification information in association with each other, the specific user ID, the image data, the receipt information data being included in the expense data obtained in the obtaining operation, the expense identification information identifying the expense data, a service identifying operation identifying service identification information which is stored in a second storage and associated with the specific user ID, the second storage being configured to store service information, the service information including at least service identification information and the user identification information in association with each other, the service information being used for a series of data processing regarding a specific business process, the service identification information identifying the service information, and a second storing operation storing, in the first storage, the service identification information and the expense identification information in association with each other, the service identification information being identified in the service identifying operation, and the expense identification information being associated with the specific user identification information.

According to aspects of the disclosures, there is provided a data management system including a terminal device and a data management server, the terminal device being configured such that an image scanner is connectable, the terminal device and the data management server being connected via a network. the terminal device having a first processor which is configured to execute an obtaining operation obtaining image data representing a receipt from the scanner, an extracting operation extracting characters included in the image data, a creating operation creating receipt information data representing the extracted characters, and a transmitting operation transmitting expense data including at least specific user identification information identifying a user, the image data, and the receipt information data, to the data management server via the network. Further, the data management server having a second processor configure to execute a receiving operation receiving the expense data from the terminal device via the network, a first storing operation storing, in a first storage, the specific user ID, the image data, the receipt information data and expense identification information in association with each other, the specific user ID, the image data, the receipt information data being included in the expense data obtained in the receiving operation, the expense identification information identifying the expense data, a service identifying operation identifying service identification information which is stored in a second storage and associated with the specific user ID stored in the first storage, the second storage being configured to store the service information, the service information including at least service identification information and the user identification information, the service identification information being the service information to be used for a series of data processing regarding a specific business process, the service identification information identifying the service information, and a second storing operation storing, in the first storage, the service identification information and the expense identification information in association with each other, the service identification information being identified in the service identifying operation, and the expense identification information being associated with the specific user identification information.

According to aspects of the disclosures, there is provided a data management server configured to be connected to a network. The data management server has a processor, a first storage configured to store data, a second storage configured to store service information used for a series of data processing regarding a specific business process, the service information including at least service identification information and user identification information, the service identification information identifying the service information, and a third storage storing computer-readable instructions that, when executed by the processor, perform processes including an obtaining operation obtaining expense data from a terminal device which is connected via the network, the expense data including at least specific user identification information, image data and receipt information data, the specific user identification information identifying a specific user, the image data representing an image of a receipt, the receipt information data representing letters and characters included in the image data, a first storing operation storing, in the first storage, the specific user ID, the image data, the receipt information data and expense identification information in association with each other, the specific user ID, the image data, the receipt information data being included in the expense data obtained in the obtaining operation, the expense identification information identifying the expense data, a service identifying operation identifying service identification information which is stored in the second storage and associated with the specific user ID, and a second storing operation storing, in the first storage, the service identification information and the expense identification information in association with each other, the service identification information being identified in the service identifying operation, and the expense identification information being associated with the specific user identification information.

BRIEF DESCRIPTION OF THE DRAWINGS

FIG. 2 shows a data structure of a user information DB (database) according to the illustrative embodiment of the present disclosure.

FIG. 3 shows a data structure of a service information DB according to the illustrative embodiment of the present disclosure.

FIG. 4 shows a data structure of an expense settlement DB according to the illustrative embodiment of the present disclosure.

FIG. 5 shows a data structure of basic information DB according to the illustrative embodiment of the present disclosure.

FIG. 9 is an example of a receipt which will be processed by the data management system according to the illustrative embodiment of the present disclosure.

FIG. 11 shows an example the basic information according to the illustrative embodiment of the present disclosure.

FIG. 12 shows an example of the specifics information according to the illustrative embodiment of the present disclosure.

DETAILED DESCRIPTION

Figure 1:
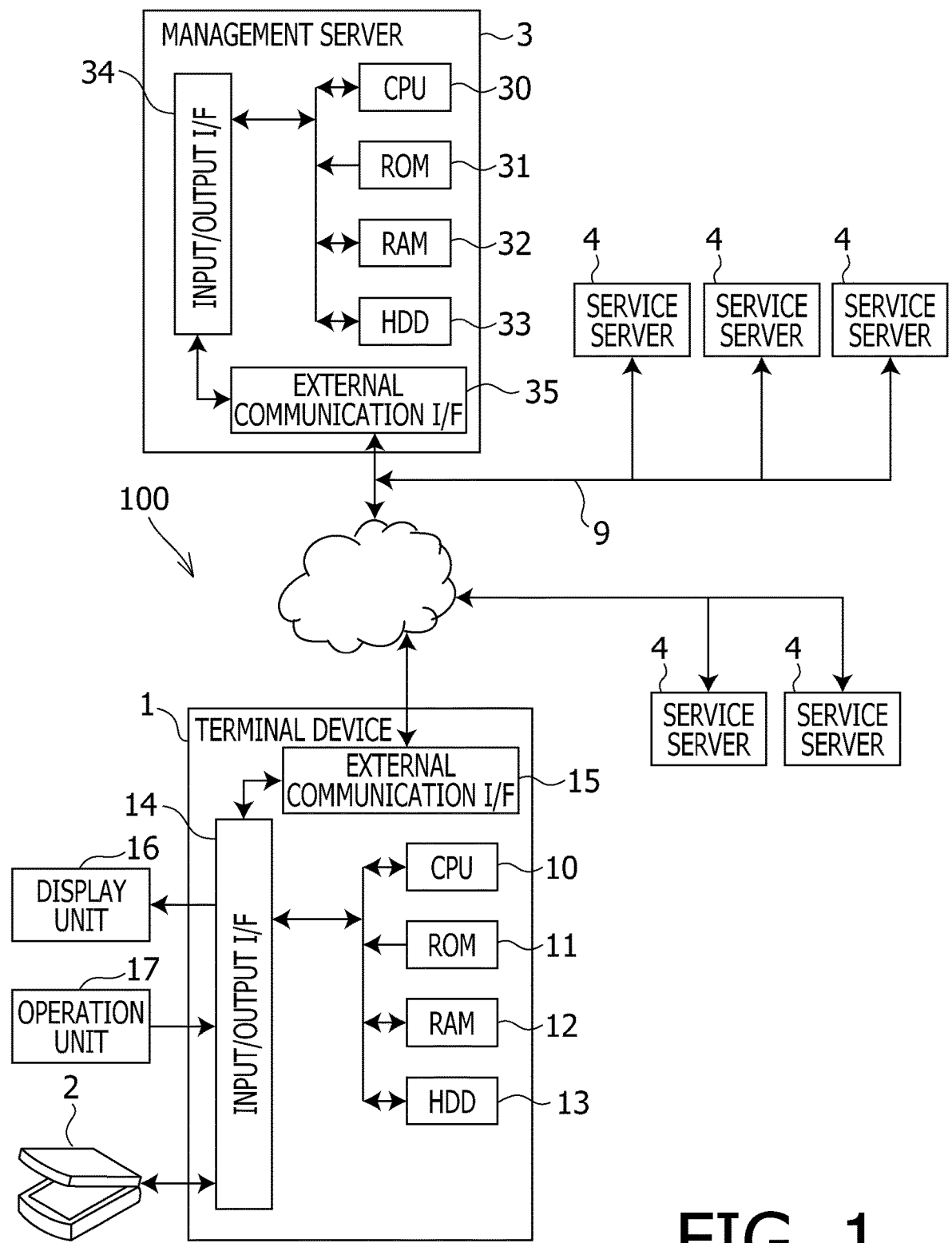
FIG. 1 is a block diagram showing an entire configuration of a data management system according to an exemplar embodiment of the present disclosures.

There has been known a workflow system in which a workflow, which is a series of data processing regarding a particular business procedure (e.g., a business trip application procedure, an equipment purchase request procedure, etc.) is executed. In such a workflow system, typically, request data to request for a service according to a workflow is stored in association with a corresponding workflow (e.g., the request data being stored in a storage unit of a server which is to provide the workflow service).

For registered business procedures such as the business trip application procedure or the equipment purchase request procedure, there is a case where expenses necessary for executing the registered procedures (e.g., the business trip application procedure, the equipment purchase request procedure and the like) is stored as expense data and requests for such expense data is done afterwards.

There has been known a system in which such expense data can be generated automatically based on receipts with use of an OCR (optical character recognition) technique. However, in such a conventional system, the generated expense data is not associated with the workflow, and the association therebetween should be made manually (i.e., the expense data should be manually associated with the registered request data).

In the present disclosure, in consideration of the above, there is provided a data management system with which expense data (i.e., data extracted from receipts) as discussed above can be automatically associated with a plurality of pieces of data (e.g., a plurality of pieces of request data), respectively. The following disclosures also provide a data management sever for the data management system, and a non-transitory computer-readable medium which stores instructions to be executed by a processor of the data management server to achieve data management function as described above.

Hereinafter, referring to the accompanying drawings, a data management system according to an embodiment of the disclosures will be described. It is noted that the drawings referred to are used for illustrating illustrative technical characteristic features. Configurations illustrated in the drawings and flowcharts for processes are illustrative ones and are not intended for limitation.

Referring to FIG. 1, a data management system 100 according to an illustrative embodiment will be described. The data management system 100 includes a terminal device 1, an image scanning device (hereinafter, simply referred to as a scanner) 2, a management server 3 and service servers 4. The terminal device 1 is configured to exchange, via the Internet 8, data and commands with the management server 3 and the service servers 4 connected to a LAN (local area network) 9 or the service servers 4 connected to the Internet 8. The scanner 2 is connected to the terminal device 1 via a cable (not shown).

In response to a user operation, the terminal device 1 registers information read from a receipt with the scanner 2 with the management server 3. The management server 3 is connected to a plurality of service servers 4 via the Internet 8 or the LAN 9. Each of the service servers 4 is configured to execute a workflow which is a series of data processing regarding a specific business procedure. Examples of such a workflow include a business trip application procedure for settling expense for a business trip, and an equipment purchase request procedure for setting expense for equipment to be purchased. The management server 3 instructs the service server 4 to execute a workflow based on information received from the terminal device 1. By workflows executed in the service servers 4, the user of the terminal device 1 can receive various services.

The terminal device 1 is has a CPU (central processing unit) 10, a ROM (read only memory) 11, a RAM (random access memory) 12, an HDD (hard disk drive) 13 and an I/O (input/output) I/F (interface) 14, which are interconnected through a bass. The ROM 11 stores programs such as a BIOS (basic input output system), and initial values and the like. The RAM 12 is configured to temporarily store data when the programs are executed by the CPU 10. The terminal device 1 may be a general purpose personal computer except for storing a dedicated program in the HDD 13 (described below).

The HDD 13 is a non-volatile storage device and stores at least an application program which causes the CPU 10 to execute an expense request procedure (described later referring to FIG. 7). The HDD 13 also stores basic information data 130 and specifics information data 140, which will be described later. To the input/output I/F 14, an external communication I/F 15, a display unit 16 displaying images, an operation unit 17 including a keyboard and a mouse, and the scanner 2. The external communication I/F 15 is used to connect the terminal device 1 to the Internet 8.

The application programs are compiled in accordance with the terminal device 1, and stored in file servers (not shown) connected to an external network outside the LAN 8, computer-readable storage media/devices provided to the management server 3 and the like. The application programs have been provided, as transitory medium (e.g., transmission signals) from the file servers and/or management server 3 to the terminal device 1 through electrical communication lines of the external network and the LAN 8. Alternatively or optionally, the application programs may be provided as being stored in a non-transitory recording medium. Examples of the non-transitory recording medium are optical, electrical or magnetic recording medium including a CD-ROM, a DVD-ROM a flash ROM, which can retain data regardless of a time period for retaining data. When such a non-transitory recording medium is employed, a reading device (not shown) configured to read data from such a non-transitory recording medium connected to the terminal device 1 retrieves application programs.

The CPU 10 stores application programs in the storage device which is readable by the computer provided to the terminal device 1. According to the illustrative embodiment, the storage device is the HDD 13. However, it is only an example, and an EEPROM (electrically erasable programmable read only memory) such as an SSD (solid state drive) or a flash memory, or any device which retains data regardless of a time period during which the data is retained, may be used alternatively or optionally.

The management server 3 includes a CPU 30, a ROM 31, a RAM 32, an HDD 33 and input/output I/F 34, which are interconnected through a bus. The ROM 31 stores programs including BIOS (basic input/output system) which cause the management server 3 to operate, and initial values. The RAM 32 is configured to temporarily store data when the programs are executed. The input/output I/F 34 is connected to an external communication I/F 35. The external communication I/F 35 is configured to connect the management server 3 to the LAN 9. The management server 3 may be a general purpose server except for storing a dedicated program in the HDD 33 (described below).

The HDD 33 stores data management program to cause the CPU 30 to execute a data management process (described later with reference to FIG. 8). The HDD 33 stores databases (hereinafter, referred to as DBs) for managing various types of data. According to the illustrative embodiment, as the DB, the HDD 33 has a user information DB 50, a service information DB 60, an expense settlement DB 70, a basic information DB 80 and a specifics information DB 90.

The data management program is compiled in accordance with the management server 3, and is stored in a computer-readable storage device provided to a file server (not shown) which is connected to an external network of the LAN 9. The data management program has been provided as transitory medium (e.g., transmission signals) transmitted from the file servers to the management server 3 through an electrical communication network such as the external network and the LAN 9. Alternatively or optionally, the data management program may be provided as one stored in a non-transitory recording medium. Examples of the non-transitory recording medium are optical, electrical or magnetic recording medium including a CD-ROM, a DVD-ROM, a flash ROM, and the like, which can retain data regardless of a time period for retaining data. When such a non-transitory recording medium is employed, a reading device (not shown) configured to read data from such a non-transitory recording medium connected to the management server 3 retrieves data management program therefrom.

The CPU 30 stores the data management program in a storage device which is readable by the computer and provided to the data management server 3. According to the illustrative embodiment, the storage device is the HDD 33. However, it is only an example, and an EEPROM (electrically erasable programmable read only memory) such as an SSD (solid state drive) or a flash memory, or any other device which retains data regardless of a time period during which the data is to be retained, may be used alternatively or optionally.

The service servers 4 may be general purpose servers. Since an electrical configuration of each of the service servers 4 is substantially the same as that of the management server 3, detailed description thereof will be omitted for brevity. It is noted that, in the HDD of each service server 4, programs and data which cause the CPU of the service server to execute the workflow are stored.

Referring to FIG. 2, the user information DB 50 stored in the HDD 33 of the management server 3 will be described. In the user information DB 50, a plurality of pieces of user information related to respective users are stored. According to the illustrative embodiment, the user information includes a user ID (hereinafter, referred to as U-ID), and individual information regarding the user. The individual information includes, for example, a login ID and a password for accessing the management server 3, a user name, a credit card number and a bank account number.

Referring to FIG. 3, the service information DB 60 stored in the HDD 33 of the management server 3 will be described. In the service information DB 60, the service information is registered. Before a service is provided based on the workflow, the terminal device 1 registers the service information with the management server 3 based on the user operation. The service information includes a service ID (hereinafter, referred to as an S-ID), the U-ID and a content of a request. The S-ID is information for identifying the service information. The U-ID is for identifying the user who has registered the service. The content of the request is set by the user. The content of the request includes, for example, as data representing attribute of the service information, a purpose of expense, a request period representing a period during which the expense is used and an expected sum of the expense. FIG. 3 shows an example of the service information which is registered, by the user, regarding a business trip application process, and includes estimated data/time of departure and estimated data/time of arrival, which represent the request period.

Referring to FIG. 4, the expense settlement DB 70 stored in the HDD 33 of the management server 3 will be described. In the expense settlement DB 70, the expense settlement data is registered. The expense settlement data includes expense ID (hereinafter, referred to as K-ID), the U-ID, the S-ID and an item related to an entire expense. The K-ID is information used to identify individual expense. The U-ID included in the expense settlement data indicates the U-ID of the user who made the expense request. The S-ID included in the expense data indicates the S-ID of the service information with which the expense settlement data is associated. The item regarding the entire expense includes, for example, the sum of expense, attachment of receipts and the like, and processed in one execution of the workflow. It is noted that the sum of expense is the sum of the expenses represented by the receipt data which is associated with the expense settlement data. The item "attachment of receipts" represents whether an image of receipt is attached to receipt data which is associated with the expense settlement data. The receipt data is data related to the receipt requested by the user and includes the basic information data and the specifics information data.

Referring to FIG. 5, the basic information DB 80 stored in the HDD 33 of the management server 3 will be described. In the basic information DB 80, the basic information data is registered for each receipt. The basic information data includes receipt basic ID (hereinafter, referred to as an R-ID), the expense settlement data K-ID, and the basic items. The R-ID represents information for identifying the basic information data. The K-ID included in the basic information data is the K-ID of the expense settlement data which is associated with the basic information data. The basic items represent outline of the receipt. For example, the basic items include an expense usage data which is, for example, the date written on the receipt, a company name which represents an issuer of the receipt, a purpose of the expense written on the receipt, a method of payment, a total amount, a number of a credit card used for payment, and image data of the receipt. It is noted that the credit card number written on the receipt is modified such that a part of digits (e.g., digits except for the last four digits) are replaced with a specific character so that the entire number cannot be known from the data. Thus, in such a case, the basic item includes a credit card number part of which is replaced with specific characters.

Figure 6:
FIG. 6 shows a data structure of specifics information DB according to the illustrative embodiment of the present disclosure.

Referring to FIG. 6, the specifics DB 90 stored in the HDD 33 of the management server 3 will be described. The specifics information DB 90 stores specifics information data for each unit of products/services written on the receipt. The specifics information data includes, for example, a receipt specifics ID (hereinafter, referred to an RM-ID), the K-ID, and items of specifics. The RM-ID is information for identifying individual specifics information data. The K-ID included in the specifics information data represents the K-ID of the expense settlement data which is associated with the specifics information data. The items of specifics represent details of the products/services. For example, the items specifics include contents of products or services, an item of expenses and money amount.

Figure 7:
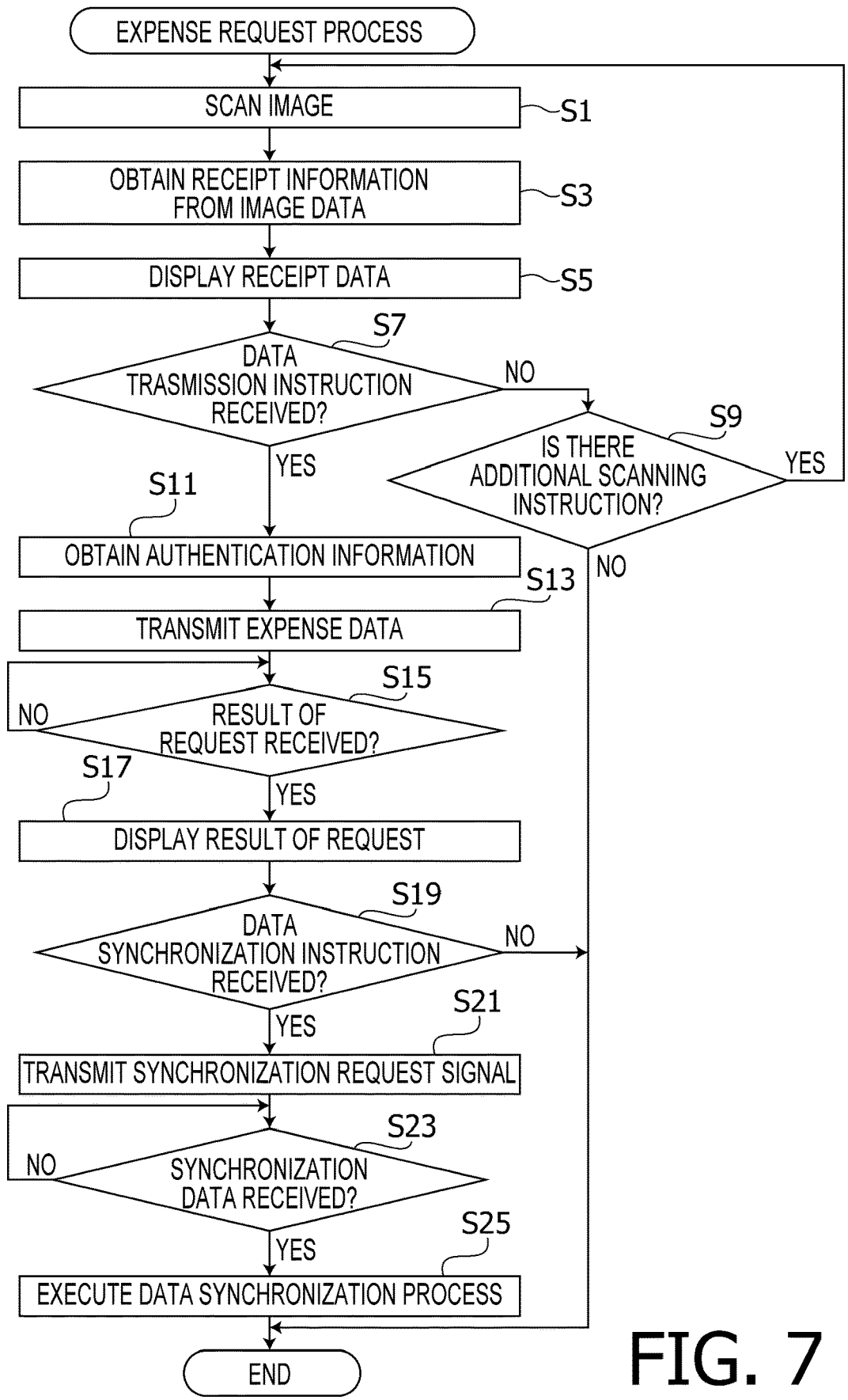
FIG. 7 is a flowchart illustrating an expense request process according to the illustrative embodiment of the present disclosure.

Referring to FIG. 7, the expense request process which is one of the processes executed in the data management system 100, and particularly is executed by the terminal device 1. The expense request process is executed by the CPU 10 of the terminal device 1 when the application program therefor stored in the HDD 13 is invoked. According to the illustrative embodiment, it is assumed that a receipt subject to the expense request has been placed on a scanning position of the scanner 2 before the application program is invoked.

As shown in FIG. 7, when the expense request process is started, the CPU 10 executes an image scanning (S1). For example, the CPU 10 transmits an image scanning instruction to the scanner 2. In response to receipt of the image scanning instruction, the scanner 2 scans the image of the receipt which is place on the scanning position of the scanner 2. Then, the scanner 2 transmits data representing the scanned image of the receipt to the CPU 10. The CPU 10 generates image data representing the image of the receipt based on the data representing the scanned image and transmitted from the scanner 2. Then, the CPU 10 stores the generated image data in the RAM 12.

Next, the CPU 10 obtains receipt information data from the image data of the receipt (S3). The receipt information data represents characters included in the image data of the receipt. The receipt information data is data indicating information regarding the expense. The receipt information data includes, as data representing attribution of the receipt information data, items extracted from receipts (e.g., a shop name, an address, a commodity item, an expense item, an amount of money, date and time, a credit card number, and the like). In S3, similar to a well-known method, the receipt information data can be collected. It is noted that, in S3, the information data is retrieve as in a conventional system. An example of such a conventional system is disclosed in US 2004/083134, teachings of which are incorporated herein by reference. That is, the CPU 10 obtains characters from the image data by executing a well-known OCR (optical character recognition) process by, for example, extracting features corresponding to outlines of letters/characters from images stored in the RAM 12 and comparing the extracted features with reference patterns of letters/characters to determine letters/characters represented by the extracted features. Then, the CPU 10 analyzes the extracted letters/characters to identify the characters related to expenses. Then, the CPU 10 generates receipt information data representing identified characters, and stores the receipt information data in the RAM 12.

Next, the CPU 10 transmits instruction to the display unit 16 to display the extracted receipt information data on the display unit 16 (S5). Thus, the user can recognize the receipt information data displayed on the display unit 16. According to the illustrative embodiment, the user is allowed to edit the receipt information data displayed on the display unit 16 with use of the operation unit 17 if necessary. For example, the CPU 10 may be configured to acquire user input, through the operation unit 17, to edit the receipt information data. The user input to edit the receipt information data which is currently displayed on the display unit 16 may be, for example, correction of the displayed receipt information data, addition of a new record of the receipt information data, deletion of the displayed receipt information data, and the like. Depending on content of the edition of the receipt information data input through the operation unit 17, the CPU 10 updates the receipt information data stored in the RAM 12.

In S7, the CPU 10 determines whether a data transmission instruction is received. For example, when there is a user input of the data transmission instruction through the operation unit 17, the CPU 10 determines that there is a data transmission instruction (S7: YES). In this case, the CPU 10 proceeds to S11. When the data transmission instruction is not received (S7: NO), the CPU 10 determines whether there is an optional scanning instruction (S9). For example, when the CPU 10 receives the user input of optional scanning instruction, the CPU 10 determines that the optional scanning instruction has been received (S9: YES).

For example, when a plurality of pieces of receipts subject to request for expense includes an unprocessed receipt, the user may place the unprocessed receipt on the scanning position of the scanner 2 and inputs the additional scanning instruction. The unprocessed receipt is a receipt of which image has not been scanned yet. When there is the additional scanning instruction (S9: YES), the CPU 10 returns to S1. With this control, for each of the unprocessed receipts, the steps S1-S5 will be repeated.

When it is determined that the data transmission instruction has been received (S7: YES), the CPU 10 obtains authentication information (S11). The authentication information is necessary for personal authentication of the user. According to the illustrative embodiment, the authentication information includes, for example, a login ID and a password. The CPU 10 may transmit an instruction to the display unit 16 to display an authentication screen for encouraging the user to input the login ID and the password on the display unit 16. Thereafter, the CPU 10 acquires the user operation of the operation unit 17 corresponding to the authentication screen to obtain the login ID and the password.

Next, the CPU 10 transmits the expense data to the management server 3 through the external communication I/F 15 (S13). The expense data includes the above-described receipt data and the authentication data obtained in S11. The receipt data includes the image data of the receipts and receipt information data stored in the RAM 12 in S1-S5. When a plurality of receipts are scanned with the scanner 2 (S9: YES, S1-S5), the expense data includes a plurality of pieces of receipt information respectively corresponding to the plurality of receipts. The CPU 10 stores the image data of the receipts and the receipt information which are included in the expense data transmitted in S13 in the HDD 13.

Next, the CPU 10 determines whether a result of request is received, through the external communication I/F 15, from the management server 3 (S15). The result of request represents whether the expense data transmitted in S13 is appropriate or not. When the result of request has been received (S15: YES), the CPU 10 transmits an instruction to the display unit 16 to display the received result of request on the display unit 16 (S17). When the CPU 10 has not received the result of request (S15: NO), the CPU 10 returns to S15 and keeps waiting for receipt of the result of request.

After execution of S17, the CPU 10 determines whether a data synchronization instruction is received (S19). For example, when the CPU 10 receives the data synchronization instruction through the operation unit 17, the CPU 10 determines that there is the data synchronization instruction (S19: YES). In such a case, the CPU 10 transmits a synchronization request signal to the management sever 3 through the external communication I/F 15 (S21). The synchronization request signal is a signal to request the management server 3 for the synchronization data. The synchronization data is the image data of the receipts and the receipt information data the user requested in the past among the data stored in the management server 3. It is noted that the CPU 10 may transmit the synchronization request signal to the management server 3 at specific timings, or the synchronization request signal may be automatically transmitted with user of a timer (not shown).

Then, the CPU 10 determines whether the synchronization data has been received from the management server 3 through the external communication I/F 15 (S23). When the synchronization data has been received (23: YES), the CPU 10 executes a data synchronization process (S25). The data synchronization process is a process of merging synchronization data received from the management server 3 with the image data of the receipts and the receipt information stored in the HDD 13. When the synchronization data has not been received (S23: NO), the CPU 10 returns to S23 and keeps waiting for receipt of the synchronization data.

When there is no additional scanning instruction (S9: NO), or there is no data synchronization instruction (S19: NO), the CPU 10 terminates the expense request process. After execution of S25, the CPU 10 terminates the expense request process, too.

Next, a data management process executed by the management server 3, which is one of processes executed in the data management system 100, will be described referring to FIG. 8. The data management process is continuously executed by the CPU 30 of the management server 3 in accordance with the data management program stored in the HDD 33.

Figure 8:
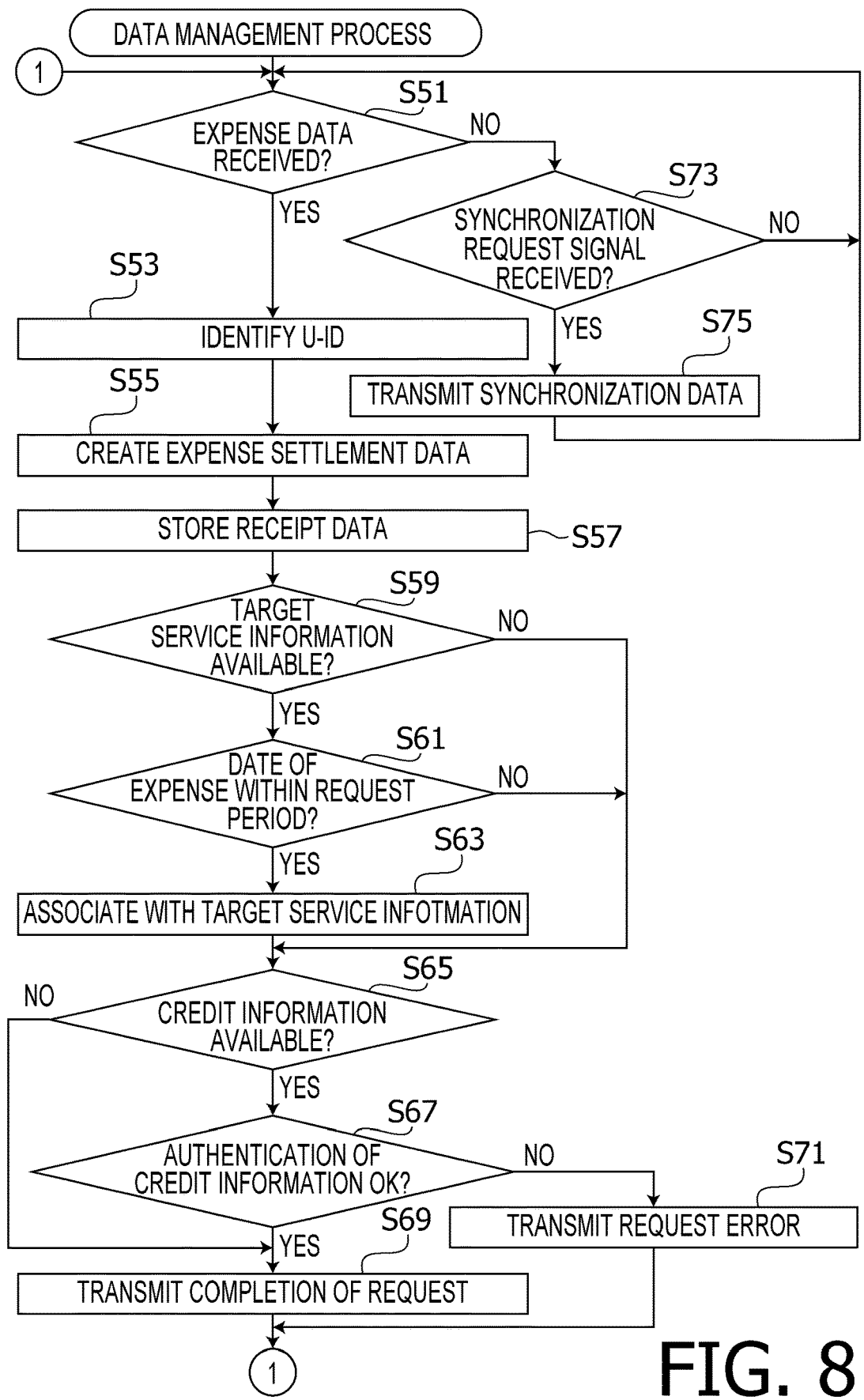
FIG. 8 is a flowchart illustrating a data management process according to the illustrative embodiment of the present disclosure.

As shown in FIG. 8, in the data management process, the CPU 30 determines whether the expense data is received from the terminal device 1 (S51). When it is determined that the expense data has been received (S51: YES), the CPU 30 identifies the U-ID (S53). For example, the CPU 30 refers to the user information DB 50 (see FIG. 2) and identifies the U-ID which is associated with the authentication information (e.g., the login ID and the password) included in the received expense data.

Next, the CPU 30 creates the expense settlement data (S55). For example, the CPU 30 identifies the sum of the expense amount based on the receipt data included in the expense data. The CPU 30 identifies whether the receipt (i.e., an image of the receipt) is attached or not based on whether image data is included in the expense data. Then, based on the above information, the CPU 30 creates the expense settlement data. The CPU 30 then registers the thus created expense settlement data with the expense settlement DB 70 (see FIG. 4). In the expense settlement data stored in the expense settlement DB 70, the K-ID assigned in S55, the U-ID identified in S53 and the sum of the expense amount and the availability of the receipt identified in S55 are stored with being associated with each other. It is noted that the S-ID of the expense settlement data has not been set at this stage.

Next, the CPU 30 stores the receipt data included in the expense data in the HDD 33 (S57). For example, the CPU 33 stores the basic information data in the basic information DB 80 (FIG. 5) and the specifics information data in the specifics information DB 90 (FIG. 6), based on the receipt data included in the expense data.

In S57, for each piece of receipt data included in the expense data, the basic information data is registered with the basic information DB 80. In the basic information data, the R-ID assigned in S57, the K-ID assigned in S55, the basic item and image data of the receipt are stored with being associated with each other. It is noted that the basic item of the receipt is set based on a plurality of pieces of receipt information corresponding to one sheet of the receipt. The image data of the receipt is the image data included in the receipt data.

In S57, for each unit of products or services included in the receipt data, the specifics information data is registered with the specifics information DB 90. The specifics information data registered with the specifics information DB 90 contains the RM-ID assigned in S57, the K-ID assigned in S55, and the specific items of the receipt, which are associated with each other. Each item of the specific items of the receipt is set based on one piece of receipt information corresponding to one unit of products or services.

Next, the CPU 30 determines whether target service information is available (S59). The target service information is service information to which the expense settlement data created in S53 is to be associated. For example, the CPU 30 compares the U-ID identified in S53 with the item of "U-ID" of the service information DB 60 (FIG. 3) to execute determination in S59. The target service information is the service information including the U-ID which is identified in S53. When the service information including the U-ID identified in S53 has been registered with the service information DB 60 (FIG. 3), the CPU 30 determines that the target service information is available (S59: YES).

When it is determined that the target service information is available (S59: YES), the CPU 30 determines whether the date of expense is within a request period (S61). For example, the CPU 30 identifies all the dates of expenses included in the receipt data stored in S57. That is, the CPU 30 identifies dates of expenses in the R-ID associated with the K-ID assigned in S55. Then, the CPU 30 refers to the service information DB 60 to identify the request period of the target service information. When all the identified dates of expenses area within the request period, the CPU 30 determines that the dates of expenses are within the request period (S61: YES).

In this case, the CPU 40 associates the various pieces of data stored in the HDD 33 with the target service information (S63). For example, the CPU 30 refers to the service information DB 60 to identify the S-ID of the target service information. Then, the CPU 30 stores the identified S-ID in the expense settlement DB 70 with associating the same with the expense settlement data corresponding to the K-ID assigned in S55 and registered in the expense settlement DB 70. With this configuration, the target service information is indirectly associated with the basic information data of the basic information DB 80 and the specific information data of the specifics information DB 90 via the expense settlement data.

Next, the CPU 30 determines whether credit information is available (S65). When the target service information is not available (S59: NO), or the date of expense is not within the request period (S61: NO), the CPU 30 executes S65. For example, when a credit card number is set, in the basic information DB 80, to the basic information data corresponding to the R-ID assigned in S57, the CPU 30 determines that the credit information is available (S65: YES).

In this case, the CPU 30 further determines whether authentication of credit information is OK (S67). For example, referring to the user information DB 50, the CPU 30 identifies the credit card number associated with the U-ID identified in S53. When the identified credit card number coincides with the credit card number of the basic information data, the CPU 30 determines that the authentication of the credit information is OK (S67: YES). It is noted that, when a part of the credit card number of the basic information data has been replaced with specific letters/characters, the CPU 30 may compare a remaining part (non-replaced part) of the credit card number of the basic information data with the corresponding part of the credit card number associated with the U-ID. In this case, the CPU 30 transmits a result of request representing "completion of request" to the terminal device 1 via the external communication I/F 35 (S69). When the authentication of the credit information is not OK (S67: NO), the CPU 30 transmits a result of request representing "request error" to the terminal device 1 via the external communication I/F 35 (S71). After execution of S69 or S71, the CPU 30 returns to S51.

When the expense data is not received (S51: NO), the CPU 30 determines whether the synchronization request signal is received from the terminal device 1 (S73). When it is determined that the synchronization request signal is received (S73: YES), the CPU 30 transmits the synchronization data to the terminal device 1 via the external communication I/F 35 (S75). For example, the CPU 30 identifies the U-ID as in S53. Then, the CPU 30 refers to the expense settlement DB 70 to identify K-ID of the expense settlement data which is associated with the identified U-ID. The CPU 30 then obtains the basic information data and the specifics information data which are associated with the identified K-ID from the basic information DB 80 and the specifics information DB 90, respectively. Next, the CPU 30 transmits the obtained basic information data and the specifics information data to the terminal device 1 as the synchronization data via the external communication I/F 35. When the synchronization request signal is not received (S73: NO) after execution of S75, the CPU 30 returns to S51.

When an execution instruction of the workflow is input in the terminal device 1, a WF execution instruction is transmitted from the terminal device 1 to the management server 3. The WF execution instruction is a command instructing execution of the workflow, and includes the U-ID of the user and the S-ID instructed by the user. When the management server 3 receives the WF execution instruction is received, the CPU 30 obtains the user information associated with the U-ID of the WF execution instruction. Further, the CPU 30 refers to the service information DB 60 to identify the service information associated with the S-ID of the WF execution instruction.

Next, the CPU 30 obtains the basic information data and the specifics information data, which are associated with the S-ID of the identified service information, from the basic information DB 80 and the specifics information DB 90, respectively. Then, the CPU 30 determines the service server 4 which is capable of executing the workflow suitable to the setting contents of the "purpose" of the identified service information. Then, the CPU 30 transmits the obtained user information, the basic information data and the specifics information data to the determined service server 4. Then, the CPU of the service server 4 executes the workflow based on the data received from the management server 3. Then, the CPU of the service server 4 notifies the result of the workflow to the terminal device 1.

Figure 10:
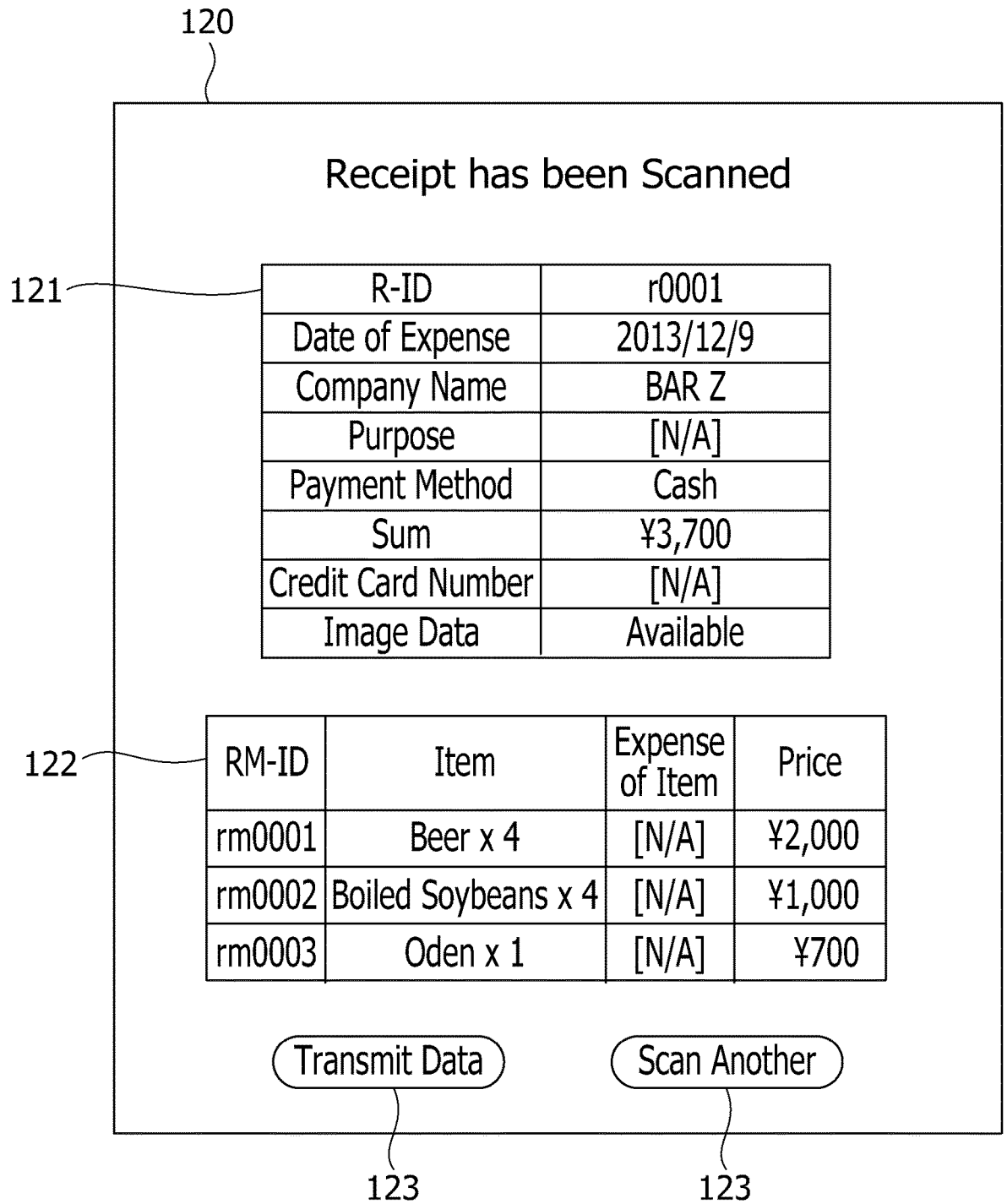
FIG. 10 is an example of a scanning completion screen according to the illustrative embodiment of the present disclosure.

Next, referring to FIGS. 7 and 9-12, an example of the expense request process will be described. Firstly, the user places the receipt 110 as shown in FIG. 9 on the scanning position of the scanner 2. As the user operates the operation unit 17 to input an invoking instruction of an application program, the application program is invoked in the terminal device 1. The receipt 110 is scanned by the scanner 2, and the receipt information data is obtained (S1, S3). As shown in FIG. 10, a scan completion screen 120 is displayed to show the obtained receipt information on the display unit 16.

The scanning completion screen 120 includes a basic display area 121, a specifics display area 122, a data transmission button 123 and an additional scanning button 124. The CPU 10 displays the basic information data of the receipt 110 on the basic display area 121 based on the receipt information obtained from the receipt 110. Further, the CPU 10 displays the specifics information data in the specifics display area 122 based on the receipt information data obtained from the receipt 110.

The CPU 10 acquires the data transmission instruction which is input as the data transmission button 123 is operated through the operation unit 17. The CPU 10 acquires the additional scanning instruction which is input as the additional scanning button 124 is operated through the operation unit 17. Further, the CPU 10 acquires an editing operation of the receipt information which is performed as the scanning completion button 120 is operated through the operation unit 17. According to the illustrative embodiment, the CPU 10 acquires an operation of inputting "drink with B company" for the "purpose" of the basic display area 121, and an operation of inputting the "business meals" for the "item" of the specifics display area 122.

In the RAM 12, the basic information data 130 (see FIG. 11) and the specifics information data 140 (see FIG. 12) are stored as the receipt data. As shown in FIG. 11, the basic information data 130 includes a receipt basic ID (hereinafter, abbreviated as "R-ID") and the basic item and image data of the corresponding receipt. The R-ID is information for identifying the basic information data 130. The basic information data 130 identified by the R-ID of "r0001" is the basic information data corresponding to the receipt 110, and includes the basic item and image data of the receipt 110. To the "purpose" and "item" of the basic information data 130 identified by the R-ID of "r0001", contents which have been edited on the scanning completion screen 120 are set.

As shown in FIG. 12, the specifics information data 140 includes the receipt specifics ID (hereinafter, referred to as "RM-ID"), R-ID of the associated basic information data 130 and the specifics items of the corresponding receipt. The RM-ID is information for identifying the specifics information data 140. The specifics information data 140 identified by the RM-IDs of "rm0001"-"rm0003" are the specifics information data corresponding to the receipt 110, and includes the specifics item of the receipt 110. To the specifics information data 140 identified by the RM-ID of "rm0001" to "rm0003", the R-ID of "r0001" of the basic information data corresponding to the receipt 110 are set.

According to the illustrative embodiment, after a second receipt is set to the scanner 2 (i.e., placed on the scanning position of the scanner 2), the CPU 10 acquires the user input of additional scanning instruction, which is input by the operation of the additional scanning button 124 through the operation unit 17 (S9: YES, S1-S5). The basic information data 130 (see FIG. 11) identified by the R-ID of "r0002" and the specifics information data 140 (see FIG. 12) identified by the RM-ID of "rm0004" are the receipt data corresponding to the second receipt. Further, after a third receipt is set to the scanner 2, by the operation of the additional scanning button 124 through the operation unit 17, another input of the additional scanning instruction is acquired (S9: YES, S1-S5). The basic information data 130 (see FIG. 11) identified by the R-ID of "r0003" and the specifics information data 140 (see FIG. 12) identified by the RM-ID of "rm0005" are the receipt data corresponding to the third receipt.

Thereafter, as the data transmission button 123 is operated through the operation unit 17, and the CPU 10 acquires the input of the data transmission instruction (S7: YES), an authentication screen (not shown) is displayed on the display unit 16. After the authentication data is input through the authentication screen (S11), the expense data is transmitted to the management server 3 (S13). According to the illustrative embodiment, the expense data includes the login ID of "yamadata" and the password of "sn1e74b", and the receipt data for the three sheets of the receipts. The receipt data for the three sheets of the receipts includes the three pieces of basic information data 130 shown in FIG. 11 and the five specifics information data 140 shown in FIG. 12.

Next, referring to FIGS. 2-6 and 8, an example of data management process will be described. In S51, the management server 3 receives the above-described expense data. Then, the CPU 30 identifies user information U-ID of "U0001" to which the login ID "yamadata", the password "sn1e74b" are set based on the user information DB 50 shown in FIG. 2 (S53). Then, the expense settlement data for the K-ID of "S0001" is created and registered with the expense settlement DB 70 (S55).

As shown in FIG. 4, to the expense settlement data for the K-ID of "K0001", the U-ID of "U0001" is set. In this example, the total amount of the sums of the three pieces of the basic information data 130 (i.e., 33700 JPY) is set to the "Total Money Amount" of the expense settlement data. Since the three pieces of the basic information data 130 include image data of the receipts, respectively, the "Attachment of Receipt" of the expense settlement data identified by the K-ID of "K0001" is set to be "Attached".

Next, the basic information data 130 included in the expense data is registered with the basic information DB 80 shown in FIG. 5 (S55). As shown in FIG. 5, R-IDs of "R0001"-"R0003" are assigned to the three pieces of the basic information data 130, respectively, and the K-ID of "K0001" is set. Similarly, as shown in FIG. 5, the specifics information data 140 (FIG. 12) included in the expense data is registered with the specifics information DB 90 (FIG. 6). As shown in FIG. 6, the RM-IDs of "RM0001"-"RM0005" are assigned to the five pieces of the specifics information data 140, respectively, and the K-ID of "K0001" is set.

According to the illustrative embodiment, the service information including the U-ID of "U0001" is registered in the service information DB 60 shown in FIG. 3 (S59: YES). Further, each "Date of Expense" of the basic information data 130 registered with the basic information DB 80 is within the request period set to the service information for the U-ID of "U0001", that is within a period from the "Departure Date/Time" to the "Arrival Date/Time" (S61: YES). Accordingly, as shown in FIG. 4, the S-ID of "S0001" set to the service information including the U-ID of "U0001" is set to the expense settlement data identified by the K-ID of "K0001" (S63). With this configuration, the service information including the U-ID of "U0001" is associated with the basic information data identified by the R-IDs of "R0001"-"R0003" and with the specifics information data identified by the RM-IDs of "RM0001"-"RM0005".

According to the illustrative embodiment, the credit card number is set to the basic information data 130 identified by the R-ID of "R0003" (S65: YES). Accordingly, depending on whether the credit card number of the basic information data 130 coincides with the credit card number set for the user information identified by the U-ID of "U0001" (S67), completion of the request or request error is notified to the terminal device 1 (S69 or S71). On the terminal device 1, the received request result is displayed (S15 or S17).

When the data synchronization instruction is input to the terminal device 1, the synchronization request signal is transmitted to the management server 3 (S19: YES, S21). In the management server 3 which has received the synchronization signal, all pieces of the basic information data and all pieces of the specifics information data including the K-ID identifying the expense settlement data to which the U-ID of "U0001" are obtained from the basic information DB 80 and the specifics information DB 90, respectively. Then, the synchronization data including the thus obtained basic information data and the specific information data is transmitted to the terminal device 1 (S73: YES, S75). In the terminal device 1, the received synchronization data is merged with the image data of the receipt and the receipt information stored in the HDD 13 (S23, S25). With this operation, it becomes possible that the user browses all the pieces of receipt data requested in the past with the terminal device 1.

According to the illustrative embodiment described above, when the management server 3 receives the expense data for the terminal device 1, the management server 3 associates the specific user ID, the image data of the receipt and the receipt information included in the expense data with the expense ID, and store the same in the basic information DB 80 and the specifics information DB 90 (S57). The management server 3 identifies the service ID associated with the specific user ID and stored in the basic information DB 80 and the specifics information DB 90 based on the service information DB 60 which stores the service ID and the user ID (S59). Further, the management server 3 associates the identified service ID with the expense ID which is associated with the specific user ID and stores the identified service ID in the basic information DB 80 and the specifics information DB 90 (S63). That is, the identified service ID is associated with the image data of the receipt and the receipt information via the expense ID. Accordingly, the management server 3 is capable of automatically associating the data extracted from the receipt with the service information which is registered corresponding to the workflow.

The management server 3 stores a plurality of pieces of receipt information included in the expense data in the basic information DB 80 and the specifics information DB 90 in association with the common expense ID (S57). Accordingly, the management server 3 is capable of associating the plurality of pieces of receipt information included in the expense data with one service information via the common expense ID.

The management server 3 determines whether attribution data included in the received receipt information correspond to attribution data included in the service information of the identified service ID (S61). When it is determined that the attribution of the receipt information corresponds to the attribution data of the service information, the management server stores the identified service ID in the basic information DB 80 and the specifics information DB 90 in association with the expense ID which is associated with the specific user ID.

For example, when the date and time represented by date/time data included in the received receipt information is within the period represented by the period data included in the service information of the identified service ID, the management server 3 determines that the attribution data of the receipt information corresponds to the attribution data of the service information (S61: YES). Accordingly, it is possible that the management server 3 associates the service information including the period data corresponding to the date/time data of the receipt information with the receipt information.

According to the illustrative embodiment, the management server 3 identifies personal information associated with the received specific user ID based on the user information DB 50 which stores the user IDs and personal information in associated manner, and determines whether the personal information included in the received receipt information corresponds to the identified personal information (S67). When the both pieces of the personal information do not correspond to each other, the management server 3 transmits an error signal to the terminal device 1 (S71). Accordingly, the management server 3 is configured to cause the terminal device 1 to notify an occurrence of an error when the personal information of the receipt information does not correspond to the personal information of the user information DB 50.

When the synchronization request signal is received, the management server 3 retrieves the image data and the receipt information associated with the user ID included in the synchronization request signal from the basic information DB 80 and the specifics information DB 90 and transmits the retrieved data to the terminal device 1 (S75). Accordingly, the management server 3 is capable of causing the terminal device 1 that has transmitted the synchronization request signal to obtain the image data of the receipt and the receipt information in the past related to the user of the terminal device 1.

The terminal device 1 obtains the image data of the receipt from the scanner 2 and generates the receipt information indicative of the characters included in the image data (S1, S3). Further, the terminal device 1 transmits the expense data which includes at least the specific user ID, image data and the receipt information to the management server 3 (S13). Accordingly, the user of the terminal device 1 can request the management server 3 which manages the service information for the data extracted from the receipt conveniently.

The terminal device 1 transmits the synchronization request signal to the data management server (S21), and stores the image data and the receipt information received from the data management server in the HDD 13 (S25). Accordingly, the terminal device 1 which has transmitted the synchronization request signal can obtain the image data of the receipt and the receipt information related to the user of the terminal device 1 in the past.

It is noted that the present disclosures are not intended to limit the aspects to the illustrative embodiment as described. Various modification can be made without departing from the aspect of the disclosures. For example, according to the illustrative embodiment, the management server 3 and the service server 4 are configured to be distinctive servers. Such a configuration can be modified such that a single server functions as both the management server 3 and the service server 4.

The attribution data of the service information (i.e., the first attribution data) needs not be limited to the data indicative of a period. For example, the attribution data of the service information may indicate a purpose, a budget or the like. Further, the attribution data of the receipt information (i.e., the second attribution data) needs not be limited to data indicative of date/time. For example, the attribution data of the receipt information may be an address, an product item, an expense item, a price and the like. When the "expense item" of the received receipt information corresponds to the "purpose" of the service information of the identified service ID, the management server 3 may determine that the attribution data of the receipt information corresponds to the attribution data of the service information (S61: YES).

The CPU 30 develops the program stored in the HDD 33 on the RAM 32, thereby functioning as a processor that executes the data management process. Instead of the CPU 30, a microcomputer, an ASIC (application specific integrated circuits) or an FPGA (field programmable gate array) may be employed to serve as the processor. The CPU 10 develops the program stored in the HDD 13 on the RAM 12, thereby functioning as a processor which executes the expense request process. Similar to the above (i.e., CPU 30), a microcomputer, an ASIC or an FPGA may be employed to serve as the processor instead of the CPU 10.

What is claimed is:

1. A non-transitory computer-readable medium storing computer-readable instructions executable by a processor of a data management server configured to be connected to a terminal device via a network, the data management server being connectable to a plurality of service servers, each of the plurality of service servers including a communication interface, a controller, and a storage device, each of the plurality of service servers being a server providing workflow services including at least one of a business trip application process and an expense request process, wherein:
the data management server comprises:
a communication interface;
a controller connected to the communication interface;
a storage device;
a user information database on the storage device of the data management server and configured to store a plurality of pieces of user information, each of the user information including a U-ID identifying a user and individual information corresponding to the U-ID,
wherein the plurality of pieces of user information being stored before the data management server receives expense data from the terminal device, the expense data being data necessary for providing the workflow services provided by the service server;
a service information database on the storage device of the data management server and configured to store a plurality of pieces of service information data, each of the plurality of pieces of service information data including an S-ID identifying one of the workflow services, and the U-ID and content of the request which corresponds to the S-ID,
wherein:
the service information data is stored by the terminal device before the data management server receives the expense data from the terminal device, the terminal device storing the service information data based on an operation through a user interface of the terminal device;
the S-ID included in the service information data indicates a selected workflow service, which is selected by the operation through the user interface from among the workflow services;
the content of request is information indicating attributes of the service information data and input through the user interface, the content of request including at least a purpose of expense, a request period representing a period during which the expense is used, and an expected sum of the expense; and
the U-ID included in each of the plurality of pieces of service information data is inputted by the operation input through the user interface and identifying specific user;
an expense settlement database on the storage device of the data management server and configured to store a plurality of pieces of expense settlement data, each of the plurality of pieces of expense settlement data including a K-ID identifying one of the plurality of pieces of expense settlement data and including the U-ID, the S-ID and an item related to an entire expense processed in one execution of the workflow service, the U-ID, the S-ID, and the item corresponding to the K-ID,
wherein:
the expense settlement data is stored in the expense settlement database by the data management server based on the expense data received from the terminal device;
the item related to the entire expense processed in one execution of the workflow service includes at least a sum of the expense represented by receipt data, which is associated with the expense settlement data;
the U-ID included in the expense settlement data identifies a user indicated by authentication information received with the expense data from the terminal device; and
the S-ID included in the expense settlement data is included in the service information data including the U-ID included in the expense settlement data from among the plurality of pieces of the expense settlement data;
a basic information database on the storage device of the data management server and configured to store a plurality of pieces of basic information data, each of the plurality of pieces of basic information data including an R-ID identifying one of the plurality of pieces of basic information data and including the K-ID and a basic item corresponding to the R-ID,
wherein:
the basic information data is stored in the basic information database by the data management server based on the expense data received from the terminal device;
the basic item includes at least a date written on a receipt indicated by the receipt data associated with the expense settlement data, a purpose of the expense written on the receipt, a method of payment and a sum of expenses written on a receipt, and image data of the receipt created by scanning the receipt by a scanner of the terminal device; and
the K-ID included in the basic information data indicates the expense settlement data associated with the receipt data corresponding to the basic information data; and
a specific information database on the storage device of the data management server and configured to store a plurality of pieces of specific information data, each of the plurality of pieces of specific information data including an RM-ID identifying one of the plurality of pieces of specific information data and including the K-ID and an item of a specific information data corresponding to the RM-ID,
wherein:
the specific information data is stored in the specific information database by the data management server based on the expense data received from the terminal device;
the item of the specific information data includes at least, for each unit of products or services written on the receipt indicated by the receipt data associated with the specific information data, contents of products or services, an item of expenses and money amount; and
the K-ID included in the specific information data indicates the expense settlement data associated with the receipt data corresponding to the specific information data; and
wherein the instructions cause, when executed by the processor, the controller of the data management server to perform:

a receiving operation receiving the expense data from the terminal device at the communication interface of the data management server via the network;

a registering operation, in response to receipt of the expense data in the receiving operation, identifying the U-ID associated with the authentication information included in the expense data referring to the user information database, identifying the sum of the expense amount based on the receipt data included in the expense data received in the receiving operation, creating the expense settlement data, registering the created expense settlement data to the expense settlement database and, based on the receipt data included in the expense data received in the receiving operation, registering the basic information to the basic information database and registering the specific information data to the specific information database, wherein:

in the expense settlement data stored in the expense settlement database, the K-ID assigned when the expense settlement data is created, the identified U-ID identified, the identified sum of the expense amount and the image data included in the received expense data being associated with each other and the S-ID being not set;

the basic information data being registered with the basic information database for each piece of receipt data included in the expense data received in the receiving operation, in the basic information database, the R-ID assigned when the basic information data is registered, the K-ID assigned when the expense settlement data is created, the basic item of the receipt indicated by the receipt data and the image data of the receipt being associated with each other; and the specific information data being registered with the specific information database for each unit of products or services included in the receipt data included in the expense data received in the receiving operation, in the specific information data, the RM-ID assigned when the specific information data is registered, the K-ID assigned when the expense settlement data is created, and the specific items of the receipt indicated by the receipt data being associated with each other, the specific items being set based on one piece of receipt information corresponding to one unit of products or services;

an identifying operation, in response to the expense settlement data being registered with the expense settlement database, the basic information data being registered with the basic information database and the specific information data being registered with the specific information database, identifying target service information including the U-ID coinciding with the U-ID identified as being associated with the authentication information included in the expense data received in the receiving operation, from among the plurality of pieces of the service information included in the service information database;

a first determining operation, in response to the target service information being identified in the identifying operation, identifying all dates of expenses included in the basic information data, which is registered with the basic information database in the registering operation of the R-ID associated with the K-ID assigned when the expense settlement data has created receipt, identifying a request period of the target service information by referring to the service information database, and determining that the dates of expenses are within the request period when all of the identified dates of expenses are within the request period;

an S-ID storing operation, in response to determination that the dates of expenses are within the request period in the first determining operation, identifying the S-ID of the target service information referring to the service information database, and storing, in the expense settlement database, the identified S-ID in association with the expense settlement data which has been registered in the expense settlement database and corresponds to the K-ID assigned when the expense settlement data is created, thereby the target service information is indirectly associated with the basic information data in the basic information database and the specific information data in the specific information database through the expense settlement data;

a second determining operation determining that credit information is available when a credit card number is included in the basic information data corresponding to the R-ID assigned when the basic information data is registered from among the plurality of pieces of the basic information in the basic information database;

a first transmitting operation, in response to determination that the credit information is available in the second determination operation, identifying user information associated with the U-ID identified as being associated with the authentication included in the expense data by referring to the user information database, identifying the credit card number included in the identified user information, determining that authentication is OK when the identified credit card number coincides with a credit card number included in the basic information data corresponding to the R-ID assigned when the basic information data is registered, determining that authentication is not OK when the identified credit card number does not coincide with the credit card number included in the basic information data corresponding to the R-ID assigned when the basic information data is registered, transmitting a result of request representing completion of the request from the communication interface of the data management server to the terminal device via the network, and transmitting a result of request representing completion of the request from the communication interface of the data management server to the terminal device via the network when the credit information is not available in the second determining operation, wherein the terminal device includes a communication interface, a controller, and a storage device, the controller being configured to transmit a WF execution instruction including the U-ID of a user and the S-ID designated by the user to the data management server by the network in response to receipt of an input of an execution instruction of the workflow service, the WF execution instruction being a command instructing execution of the workflow; and a server determining operation and a third transmitting operation, performed by the controller of the data management server in response to receipt of the WF execution instruction from the terminal device before the result of request representing completion of the request is transmitted to the terminal device in the first transmitting operation, wherein the server determining operation includes:
identifying the service information associated with the S-ID included in the WF execution instruction referring to the service information database; and
determining a service server which is indicated by the identified service information and is capable of executing the workflow suitable to a purpose for using the expense from the plurality of service servers, and wherein the third transmitting operation includes:
obtaining the user information associated with the U-ID included in the WF execution instruction referring to the user information database;
obtaining the basic information data associated with the S-ID of the identified service information from the basic information database;
obtaining the specific information data associated with the S-ID of the identified service information from the specific information database; and
transmitting the user information obtained from the user information database, the basic information obtained from the basic information database and the specific information data obtained from the specific information database to the communication interface of the determined service server determined by the server determining operation via the network in order to cause the determined server to execute the workflow and to cause the terminal device to obtain a result of execution of the workflow.

2. The non-transitory computer-readable medium according to claim 1, wherein:
the expense data includes a plurality of pieces of the receipt data; and
the registering operation registers, in the basic information database, the plurality of pieces of receipt data and the K-ID in association with each other.

3. The non-transitory computer-readable medium according to claim 1, wherein:
the receipt data further includes personal information of the user;
the processes further comprise:
a personal information specifying operation specifying the personal information associated with the U-ID referring to the user information database;
a personal information determining operation determining whether the personal information included in the receipt data corresponds to the specified personal information which is identified by the personal information specifying operation; and
an error transmission operation transmitting an error signal to the terminal device via the network in response to determination that the personal information included in the receipt data does not correspond to the identified personal information by the personal information determining operation.

4. The non-transitory computer-readable medium according to claim 3, wherein the personal information includes at least information indicative of at least a part of a credit card number.

5. The non-transitory computer-readable medium according to claim 1, wherein the processes further comprise a data synchronization operation operating, based on receipt of a synchronization request signal from the terminal device via the network, to retrieve the image data and the receipt data associated with the user information included in the synchronization request signal from the basic information database, and to transmit the retrieved image data and the receipt data to the terminal device.

6. The data management system according to claim 1, wherein, in response to the target service information being not identified in the identifying operation, the second processor does not execute the S-ID storing operation.

7. The data management system according to claim 1, wherein, in response to determination that the dates of expenses are not within the request period in the first determining operation, the second processor does not execute the S-ID storing operation.

8. A data management system including a terminal device and a data management server, the terminal device and the data management server being connected via a network, the data management server being connectable to a plurality of service servers, each of the plurality of service servers including a communication interface, a controller, and a storage device, each of the plurality of service servers being a server providing workflow services including at least one of a business trip application process and an expense request process, wherein:
the data management server comprises:
a communication interface;
a controller connected to the communication interface;
a storage device;
a user information database on the storage device of the data management server and configured to store a plurality of pieces of user information, each of the user information including a U-ID identifying a user and individual information corresponding to the U-ID,
wherein the plurality of pieces of user information being stored before the data management server receives expense data from the terminal device, the expense data being a data necessary for providing the workflow services provided by the service server;
a service information database on the storage device and configured to store a plurality of pieces of service information data, each of the plurality of pieces of service information data including an S-ID identifying one of the workflow services, and the U-ID and content of request which correspond to the S-ID,
wherein:
the service information data is stored by the terminal device before the data management server receives the expense data from the terminal device, the terminal device storing the service information data based on an operation through a user interface of the terminal device;
the S-ID included in the service information data indicates a selected workflow service which is selected by the operation through the user interface from among the workflow services;
the content of request is information indicating attributes of the service information data and input through the user interface, the content of request including at least a purpose of expense, a request period representing a period during which the expense is used, and an expected sum of the expense; and the U-ID included in each of the plurality of pieces of service information data is inputted by the operation input through the user interface and identifying specific user;

an expense settlement database on the storage device of the data management server and configured to store a plurality of pieces of expense settlement data, each of the plurality of pieces of expense settlement data including a K-ID identifying one of the plurality of pieces of expense settlement data and including the U-ID, the S-ID and an item related to an entire expense processed in one execution of the workflow service, the U-ID, the S-ID and the item corresponding to the K-ID, wherein:

the expense settlement data is stored in the expense settlement database by the data management server based on the expense data received from the terminal device;

the item related to the entire expense processed in one execution of the workflow service includes at least a sum of the expense represented by receipt data which is associated with the expense settlement data;

the U-ID included in the expense settlement data identifies a user indicated by authentication information received with the expense data from the terminal device; and the S-ID included in the expense settlement data is included in the service information data including the U-ID included in the expense settlement data from among the plurality of pieces of the expense settlement data;

a basic information database on the storage device of the data management server and configured to store a plurality of pieces of basic information data, each of the plurality of pieces of basic information data including an R-ID identifying one of the plurality of pieces of basic information data and including the K-ID and a basic item corresponding to the R-ID, wherein:

the basic information data is stored in the basic information database by the data management server based on the expense data received from the terminal device;

the basic item includes at least a date written on a receipt indicated by the receipt data associated with the expense settlement data, a purpose of the expense written on the receipt, a method of payment and a sum of expenses written on a receipt, and image data of the receipt created by scanning the receipt by a scanner of the terminal device; and the K-ID included in the basic information data indicates the expense settlement data associated with the receipt data corresponding to the basic information data; and a specific information database on the storage device of the data management server and configured to store a plurality of pieces of specific information data, each of the plurality of pieces of specific information data including an RM-ID identifying one of the plurality of pieces of specific information data and including the K-ID and an item of a specific information data corresponding to the RM-ID, wherein:

the specific information data is stored in the specific information database by the data management server based on the expense data received from the terminal device, the item of the specific information data includes at least, for each unit of products or services written on the receipt indicated by the receipt data associated with the specific information data, contents of products or services, an item of expenses and money amount, and the K-ID included in the specific information data indicates the expense settlement data associated with the receipt data corresponding to the specific information data; and the terminal device comprises the user interface, a displays and a scanner;

the terminal device registers the service information to the service information database of the data management server based on an operation through the user interface before receiving provision of the workflow services provided from the service server;

the terminal device having a communication interface and a first processor which is configured to execute:

an obtaining operation transmitting an image scanning instruction from the communication interface of the terminal device to the scanner on which the receipt is placed, receiving data indicating a scanning result of the receipt from the scanner receiving the image scanning instruction, and obtaining image data representing the receipt from the received data;

a creating operation, in response to obtaining of the image data in the obtaining operation, extracting characters included in the image data by executing an optical character recognition process with respect to the image data, the characters representing at least one of a shop name, an address, a commodity item, an expense item, an amount of money, date and time, or a credit card number, the creating operation creating receipt information data representing the extracted characters;

an updating operation, in response to creation of the receipt information data in the creation operation, displaying the receipt information data on the display of the terminal device, receiving an edit instruction instructing to edit the receipt information data through the user interface of the terminal device, and updating the receipt information data in accordance with the edit instruction;

an inputting operation displaying an authentication screen for inputting an authentication information necessary for personal authentication of the user and acquiring an input of the authentication information through the user interface; and a first transmitting operation transmitting expense data including at least the authentication information received in the inputting operation, the image data obtained in the obtaining operation, and the receipt information data created in the creating operation and updated in the updating operation, to the data management server via the network, the data management server having a second processor configured to execute:

a receiving operation receiving the expense data from the terminal device via the network;

a registering operation, in response to receipt of the expense data in the receiving operation, identifying the U-ID associated with the authentication information included in the expense data referring to the user information database, identifying the sum of the expense amount based on the receipt data included in the expense data received in the receiving operation, creating the expense settlement data, registering the created expense settlement data to the expense settlement database and, based on the receipt data included in the expense data received in the receiving operation, registering the basic information to the basic information database and registering the specific information data to the specific information database, wherein:

in the expense settlement data stored in the expense settlement database, the K-ID assigned when the expense settlement data is created, the identified U-ID identified, the identified sum of the expense amount and the image data included in the received expense data being associated with each other and the S-ID being not set;

the basic information data being registered with the basic information database for each piece of receipt data included in the expense data received in the receiving operation, in the basic information database, the R-ID assigned when the basic information data is registered, the K-ID assigned when the expense settlement data is created, the basic item of the receipt indicated by the receipt data and the image data of the receipt being associated with each other; and the specific information data being registered with the specific information database for each unit of products or services included in the receipt data included in the expense data received in the receiving operation, in the specific information data, the RM-ID assigned when the specific information data is registered, the K-ID assigned when the expense settlement data is created, and the specific items of the receipt indicated by the receipt data being associated with each other, the specific items being set based on one piece of receipt information corresponding to one unit of products or services;

an identifying operation, in response to the expense settlement data being registered with the expense settlement database, the basic information data being registered with the basic information database and the specific information data being registered with the specific information database, identifying target service information including the U-ID coinciding with the U-ID identified as being associated with the authentication information included in the expense data received in the receiving operation, from among the plurality of pieces of the service information included in the service information database;

a first determining operation, in response to the target service information being identified in the identifying operation, identifying all dates of expenses included in the basic information data, which is registered with the basic information database in the registering operation of the R-ID associated with the K-ID assigned when the expense settlement data has created receipt, identifying a request period of the target service information by referring to the service information database, and determining that the dates of expenses are within the request period when all of the identified dates of expenses are within the request period;

an S-ID storing operation, in response to determination that the dates of expenses are within the request period in the first determining operation, identifying the S-ID of the target service information referring to the service information database, and storing, in the expense settlement database, the identified S-ID in association with the expense settlement data which has been registered in the expense settlement database and corresponds to the K-ID assigned when the expense settlement data is created, thereby the target service information is indirectly associated with the basic information data in the basic information database and the specific information data in the specific information database through the expense settlement data;

a second determining operation determining that credit information is available when a credit card number is included in the basic information data corresponding to the R-ID assigned when the basic information data is registered from among the plurality of pieces of the basic information in the basic information database;

a second transmitting operation, in response to determination that the credit information is available in the second determination operation, identifying user information associated with the U-ID identified as being associated with the authentication included in the expense data by referring to the user information database, identifying the credit card number included in the identified user information, determining that authentication is OK when the identified credit card number coincides with a credit card number included in the basic information data corresponding to the R-ID assigned when the basic information data is registered, determining that authentication is not OK when the identified credit card number does not coincide with the credit card number included in the basic information data corresponding to the R-ID assigned when the basic information data is registered, transmitting a result of request representing completion of the request from the communication interface of the data management server to the terminal device via the network, and transmitting a result of request representing completion of the request from the communication interface of the data management server to the terminal device via the network when the credit information is not available in the second determining operation, wherein the terminal device is configured to transmit a WF execution instruction including the U-ID of a user and the S-ID designated by the user to the data management server by the network in response to receipt of an input of an execution instruction of the workflow service, the WF execution instruction being a command instructing execution of the workflow; and a server determining operation and a third transmitting operation, performed by the controller of the data management server in response to receipt of the WF execution instruction from the terminal device before the result of request representing completion of the request is transmitted from the communication interface of the data management server to the terminal device in the second transmitting operation, wherein the server determining operation includes:
  identifying the service information associated with the S-ID included in the WF execution instruction referring to the service information database; and
  determining a service server which is indicated by the identified service information and is capable of executing the workflow suitable to a purpose for using the expense from the plurality of service servers; and
wherein the third transmitting operation includes:
  obtaining the user information associated with the U-ID included in the WF execution instruction referring to the user information database;
  obtaining the basic information data associated with the S-ID of the identified service information from the basic information database;
  obtaining the specific information data associated with the S-ID of the identified service information from the specific information database; and
  transmitting the user information obtained from the user information database, the basic information obtained from the basic information database and the specific information data obtained from the specific information database to the communication interface of the determined service server determined by the server determining operation via the network in order to cause the determined server to execute the workflow and to cause the terminal device to obtain a result of execution of the workflow.

9. The data management system according to claim 8, wherein:
  the first processor is configured to further execute:
    a signal transmitting operation transmitting a synchronization request signal including the user information to the data management server via the network; and
    based on receipt of the image data and the receipt information data from the data management server via the network, a data storing operation storing the received image data and the received receipt information data in a storage of the terminal device,
  the second processor is configured to further execute:
    based on receipt of a synchronization request signal from the terminal device via the network, a data synchronization operation operating to retrieve the image data and the receipt data associated with the user information included in the synchronization request signal from the basic information database, and transmit the retrieved image data and the receipt data to the terminal device.

10. The data management system according to claim 8, wherein the data management server comprises the service server.

11. The data management system according to claim 8, wherein the result of execution of the workflow indicates money amount data for respective receipts and money amount data for respective expense items.

12. The data management system according to claim 8, wherein, in response to a user request at the terminal device, the data management server is configured to provide past data indicating the result of execution of the workflow.

13. The data management system according to claim 8, wherein, in response to the target service information being not identified in the identifying operation, the second processor does not execute the S-ID storing operation.

14. The data management system according to claim 8, wherein, in response to determination that the dates of expenses are not within the request period in the first determining operation, the second processor does not execute the S-ID storing operation.

15. A data management server configured to be connected to a terminal device via a network, the data management server being connectable to a plurality of service servers, each of the plurality of service servers including a communication interface, a controller, and a storage device, each of the plurality of service servers being a server providing workflow services including at least one of a business trip application process and an expense request process, wherein the data management server comprises:
  a communication interface;
  a controller connected to the communication interface;
  a storage device;
  a user information database on the storage device of the data management server and configured to store a plurality of pieces of user information, each of the user information including a U-ID identifying a user and individual information corresponding to the U-ID,
  wherein the plurality of pieces of user information being stored before the data management server receives expense data from the terminal device, the expense data being a data necessary for providing the workflow services provided by the service server; and
  a service information database on the storage device of the data management server and configured to store a plurality of pieces of service information data, each of the plurality of pieces of service information data including an S-ID identifying one of the workflow services, and the U-ID and content of request which correspond to the S-ID,
  wherein:
    the service information data is stored by the terminal device before the data management server receives the expense data from the terminal device, the terminal device storing the service information data based on an operation through a user interface of the terminal device;
    the S-ID included in the service information data indicates a selected workflow service which is selected by the operation through the user interface from among the workflow services;
    the content of request is information indicating an attribute of the service information data and input through the user interface, the content of request including at least a purpose of the expense, a request period representing a period during which the expense is used, and an expected sum of the expense; and
    the U-ID included in each of the plurality of pieces of service information data is input by the operation input through the user interface and identifying specific user;
  an expense settlement database on the storage device of the data management server and configured to store a plurality of pieces of expense settlement data, each of the plurality of pieces of expense settlement data including a K-ID identifying one of the plurality of pieces of expense settlement data and including the U-ID, the S-ID, and an item related to an entire expense processed in one execution of the workflow service, the U-ID, the S-ID, and the item corresponding to the K-ID,
  wherein:

the expense settlement data is stored in the expense settlement database by the data management server based on the expense data received from the terminal device;

the item related to the entire expense processed in one execution of the workflow service includes at least a sum of the expense represented by receipt data which is associated with the expense settlement data;

the U-ID included in the expense settlement data identifies a user indicated by authentication information received with the expense data from the terminal device; and the S-ID included in the expense settlement data is included in the service information data including the U-ID included in the expense settlement data from among the plurality of pieces of the expense settlement data;

a basic information database on the storage device of the data management server and configured to store a plurality of pieces of basic information data, each of the plurality of pieces of basic information data including an R-ID identifying one of the plurality of pieces of basic information data and including the K-ID and a basic item corresponding to the R-ID, wherein:

the basic information data is stored in the basic information database by the data management server based on the expense data received from the terminal device;

the basic item includes at least a date written on a receipt indicated by the receipt data associated with the expense settlement data, a purpose of the expense written on the receipt, a method of payment and a sum of expenses written on a receipt, and image data of the receipt created by scanning the receipt by a scanner of the terminal device; and the K-ID included in the basic information data indicates the expense settlement data associated with the receipt data corresponding to the basic information data; and a specific information database on the storage device of the data management server and configured to store a plurality of pieces of specific information data, each of the plurality of pieces of specific information data including an RM-ID identifying one of the plurality of pieces of specific information data and including the K-ID and an item of a specific information data corresponding to the RM-ID, wherein:

the specific information data is stored in the specific information database by the data management server based on the expense data received from the terminal device, the item of the specific information data includes at least, for each unit of products/services written on the receipt indicated by the receipt data associated with the specific information data, contents of products or services, an item of expenses, and money amount, and the K-ID included in the specific information data indicates the expense settlement data associated with the receipt data corresponding to the specific information data; and wherein the data management server further comprises a processor configured to execute:

a receiving operation receiving the expense data at the communication interface of the data management server from the terminal device via the network;

a registering operation, in response to receipt of the expense data in the receiving operation, identifying the U-ID associated with the authentication information included in the expense data referring to the user information database, identifying the sum of the expense amount based on the receipt data included in the expense data received in the receiving operation, creating the expense settlement data, registering the created expense settlement data to the expense settlement database and, based on the receipt data included in the expense data received in the receiving operation, registering the basic information to the basic information database and registering the specific information data to the specific information database, wherein:

in the expense settlement data stored in the expense settlement database, the K-ID assigned when the expense settlement data is created, the identified U-ID identified, the identified sum of the expense amount and the image data included in the received expense data being associated with each other and the S-ID being not set;

the basic information data being registered with the basic information database for each piece of receipt data included in the expense data received in the receiving operation, in the basic information database, the R-ID assigned when the basic information data is registered, the K-ID assigned when the expense settlement data is created, the basic item of the receipt indicated by the receipt data and the image data of the receipt being associated with each other; and the specific information data being registered with the specific information database for each unit of products or services included in the receipt data included in the expense data received in the receiving operation, in the specific information data, the RM-ID assigned when the specific information data is registered, the K-ID assigned when the expense settlement data is created, and the specific items of the receipt indicated by the receipt data being associated with each other, the specific items being set based on one piece of receipt information corresponding to one unit of products or services;

an identifying operation, in response to the expense settlement data being registered with the expense settlement database, the basic information data being registered with the basic information database and the specific information data being registered with the specific information database, identifying target service information including the U-ID coinciding with the U-ID identified as being associated with the authentication information included in the expense data received in the receiving operation, from among the plurality of pieces of the service information included in the service information database;

a first determining operation, in response to the target service information being identified in the identifying operation, identifying all dates of expenses included in the basic information data, which is registered with the basic information database in the registering operation of the R-ID associated with the K-ID assigned when the expense settlement data is created receipt, identifying a request period of the target service information by referring to the service information database, and determining that the dates of expenses are within the request period when all the identified dates of expenses within the request period;

an S-ID storing operation, in response to determination that the dates of expenses are within the request period in the first determining operation, identifying the S-ID of the target service information referring to the service information database, and storing, in the expense settlement database, the identified S-ID in association with the expense settlement data which has been registered in the expense settlement database and corresponds to the K-ID assigned when the expense settlement data is created, thereby the target service information is indirectly associated with the basic information data in the basic information database and the specific information data in the specific information database through the expense settlement data;

a second determining operation determining that credit information is available when a credit card number is included in the basic information data corresponding to the R-ID assigned when the basic information data is registered from among the plurality of pieces of the basic information in the basic information database;

a first transmitting operation, in response to determination that the credit information is available in the second determination operation, identifying user information associated with the U-ID identified as being associated with the authentication included in the expense data by referring to the user information database, identifying the credit card number included in the identified user information, determining that authentication is OK when the identified credit card number coincides with a credit card number included in the basic information data corresponding to the R-ID assigned when the basic information data is registered determining that authentication is not OK when the identified credit card number does not coincide with the credit card number included in the basic information data corresponding to the R-ID assigned when the basic information data is registered, transmitting a result of request representing completion of the request from the communication interface of the data management server to the terminal device via the network and transmitting a result of request representing completion of the request from the communication interface of the data management server to the terminal device via the network when the credit information is not available in the second determining operation, wherein the terminal device is configured to transmit a WF execution instruction including the U-ID of a user and the S-ID designated by the user to the data management server by the network in response to receipt of an input of an execution instruction of the workflow service, the WF execution instruction being a command instructing execution of the workflow; and a server determining operation and a third transmitting operation, performed by the controller of the data management server in response to receipt of the WF execution instruction from the terminal device before the result of request representing completion of the request is transmitted to the terminal device in the first transmitting operation, wherein the server determining operation includes:
  identifying the service information associated with the S-ID included in the WF execution instruction referring to the service information database; and
  determining a service server which is indicated by the identified service information and is capable of executing the workflow suitable to a purpose for using the expense from the plurality of service servers; and wherein the third transmitting operation includes:
  obtaining the user information associated with the U-ID included in the WF execution instruction referring to the user information database;
  obtaining the basic information data associated with the S-ID of the identified service information from the basic information database;
  obtaining the specific information data associated with the S-ID of the identified service information from the specific information database; and
  transmitting the user information obtained from the user information database, the basic information obtained from the basic information database and the specific information data obtained from the specific information database from the communication interface of the data management server to the determined service server determined by the server determining operation via the network in order to cause the determined server to execute the workflow and to cause the terminal device to obtain a result of execution of the workflow.

\* \* \* \* \*